United States Patent
Sarangapani et al.

(10) Patent No.: US 10,110,455 B2
(45) Date of Patent: Oct. 23, 2018

(54) SERVICE LATENCY MONITORING USING TWO WAY ACTIVE MEASUREMENT PROTOCOL

(71) Applicant: Juniper Networks, Inc., Sunnyvale, CA (US)

(72) Inventors: Srivathsa Sarangapani, Bangalore (IN); Peyush Gupta, Bangalore (IN); Amit Kumar Agarwal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/641,827

(22) Filed: Jul. 5, 2017

(65) Prior Publication Data

US 2017/0302548 A1     Oct. 19, 2017

Related U.S. Application Data

(63) Continuation of application No. 14/573,167, filed on Dec. 17, 2014, now Pat. No. 9,705,769.

(51) Int. Cl.
*G06F 15/16*    (2006.01)
*H04L 12/26*    (2006.01)
*H04L 29/08*    (2006.01)
*H04L 29/06*    (2006.01)

(52) U.S. Cl.
CPC ........ *H04L 43/0864* (2013.01); *H04L 67/141* (2013.01); *H04L 67/42* (2013.01)

(58) Field of Classification Search
CPC .... H04L 43/0864; H04L 67/141; H04L 67/42
See application file for complete search history.

(56) References Cited

U.S. PATENT DOCUMENTS

| 7,415,038 | B2 | 8/2008 | Ullmann |
| 9,705,769 | B1 | 7/2017 | Sarangapani et al. |
| 2010/0332650 | A1 | 12/2010 | Aisen |
| 2015/0019713 | A1 | 1/2015 | Bugenhagen |
| 2015/0288514 | A1 | 10/2015 | Pahl |

(Continued)

OTHER PUBLICATIONS

Hedayat et al. "A Two-Way Active Measurement Protocol (TWAMP)," RFC 5357, https://tools.ietf.org/html/rfc5357, Oct. 3, 2008, 52 pages.

(Continued)

*Primary Examiner* — Ryan Jakovac
(74) *Attorney, Agent, or Firm* — Harrity & Harrity, LLP

(57) ABSTRACT

A device may establish a communication session, with a client device, for monitoring a latency of a service. The device may receive, from the client device, a request for a monitored service list. The monitored service list may identify one or more services for which service latency monitoring is supported. The device may provide, to the client device, the monitored service list. The device may receive, from the client device, a service latency monitoring session request that may identify the service to be monitored. The device may establish, with the client device, the service latency monitoring session based on the service latency monitoring session request. The device may cause the service to be performed. The device may generate information for determining the latency of the service. The device may transmit, to the client device and via the service latency monitoring session, the information for determining the latency of the service.

20 Claims, 12 Drawing Sheets

(56) References Cited

U.S. PATENT DOCUMENTS

2016/0164978 A1  6/2016  De Lemos

OTHER PUBLICATIONS

Backstrom, "Performance Measurement of IP Networks using the Two-Way Active Measurement Protocol," Royal Institute of Technology: School of Computer Science and Communication, http://www.nada.kth.se/utbildning/grukth/exjobb/rapportlistor/2009/rapporter09.backstrom_ingmar_09038.pdf.2009, 51 pages.

SERVICE LATENCY MONITORING USING TWO WAY ACTIVE MEASUREMENT PROTOCOL

RELATED APPLICATION

This application is a continuation of U.S. patent application Ser. No. 14/573,167, filed Dec. 17, 2014 (now U.S. Pat. No. 9,705,769), which is incorporated herein by reference.

BACKGROUND

A residence time of a packet within a network device may refer to a quantity of time between an arrival time (e.g., a time that the packet is received by the network device) and a transmission time (e.g., a time that the packet is transmitted by the network device). Residence time may be used for network visibility purposes, network debugging purposes, network planning purposes, or the like. Residence time may also be referred to as latency or delay.

SUMMARY

According to some possible implementations, a device may include one or more processors to: establish a communication session, with a client device, for monitoring a latency of a service; receive, from the client device, a request for a monitored service list, the monitored service list identifying one or more services for which service latency monitoring is supported; provide, to the client device and based on the request for the monitored service list, the monitored service list; receive, from the client device, a service latency monitoring session request, the service latency monitoring session request identifying the service to be monitored, the service being included in the monitored service list; establish, with the client device, the service latency monitoring session based on the service latency monitoring session request; cause the service to be performed; generate information for determining the latency of the service; and transmit, to the client device and via the service latency monitoring session, the information for determining the latency of the service.

According to some possible implementations, a computer-readable medium may store one or more instructions that, when executed by one or more processors, cause the one or more processors to: establish, with a client device, a communication session for monitoring latency of a service; provide, to the client device and via the communication session, a monitored service list, the monitored service list identifying one or more services for which latency monitoring is supported; receive, from the client device, a request for a latency monitoring session, the request for the latency monitoring session identifying the service to be monitored; establish, with the client device, a latency monitoring session; cause the service to be performed; generate latency information for determining a latency of the service; determine the latency of the service based on the latency information; and provide, to the client device, information identifying the latency of the service.

According to some possible implementations, a method may include: establishing, by a device, a communication session with a client device; transmitting, by the device and to the client device via the communication session, a monitored service list, the monitored service list identifying one or more services for which latency monitoring is supported; receiving, by the device and from the client device via the communication session, a latency monitoring session request, the latency monitoring session request identifying one or more services to be monitored, based on the monitored service list; establishing, by the device and with the client device, the latency monitoring session; causing, by the device, the service to be performed; generating, by the device, latency information for determining one or more latencies of the one or more services; and transmitting, by the device and to the client device via the latency monitoring session, the latency information, the latency information permitting the client device to determine the one or more latencies of the one or more services.

DETAILED DESCRIPTION

The following detailed description of example implementations refers to the accompanying drawings. The same reference numbers in different drawings may identify the same or similar elements.

A service provider may provide a service (e.g., a service in a transport layer, a network layer, a data link layer, or a physical layer of a network, such as an internet protocol (IP) traffic flow monitoring service, an internet protocol security (IPSEC) service, or the like), via a service provider network, which a user may utilize via a client device. The service may be performed on network traffic (e.g., packets) transmitted and/or received by the client device. However, performing the service on the network traffic may introduce latency to the network traffic. Additional latency may be caused by a network device associated with transferring the network traffic. The user may wish to determine, via a communication session which may be secure, a round-trip latency associated with the network traffic. More specifically, the user may wish to distinguish the latency associated with performing the service, from the latency associated with the network device.

The user may use a two-way active measurement protocol to measure the round-trip latency of the network. However, the two-way active measurement protocol may not be capable of distinguishing different causes of latency associated with the round-trip latency. More specifically, the two-way active measurement protocol may not be capable of distinguishing the latency associated with the service from the latency associated with the network device.

Implementations described herein may assist a client device with determining the latency associated with the service, in addition to the round-trip latency associated with the network traffic, via a communication session which may be secure. The client device may also distinguish the latency associated with the service from the latency associated with the network device. In this way, the client device may determine one or more latencies, associated with one or more services. In some cases, the client device may compare the one or more latencies associated with the one or more services to select a service based on the one or more latencies. Implementations described herein may further assist a network operator in designing and building a network in an efficient and latency-sensitive manner.

Figure 1:
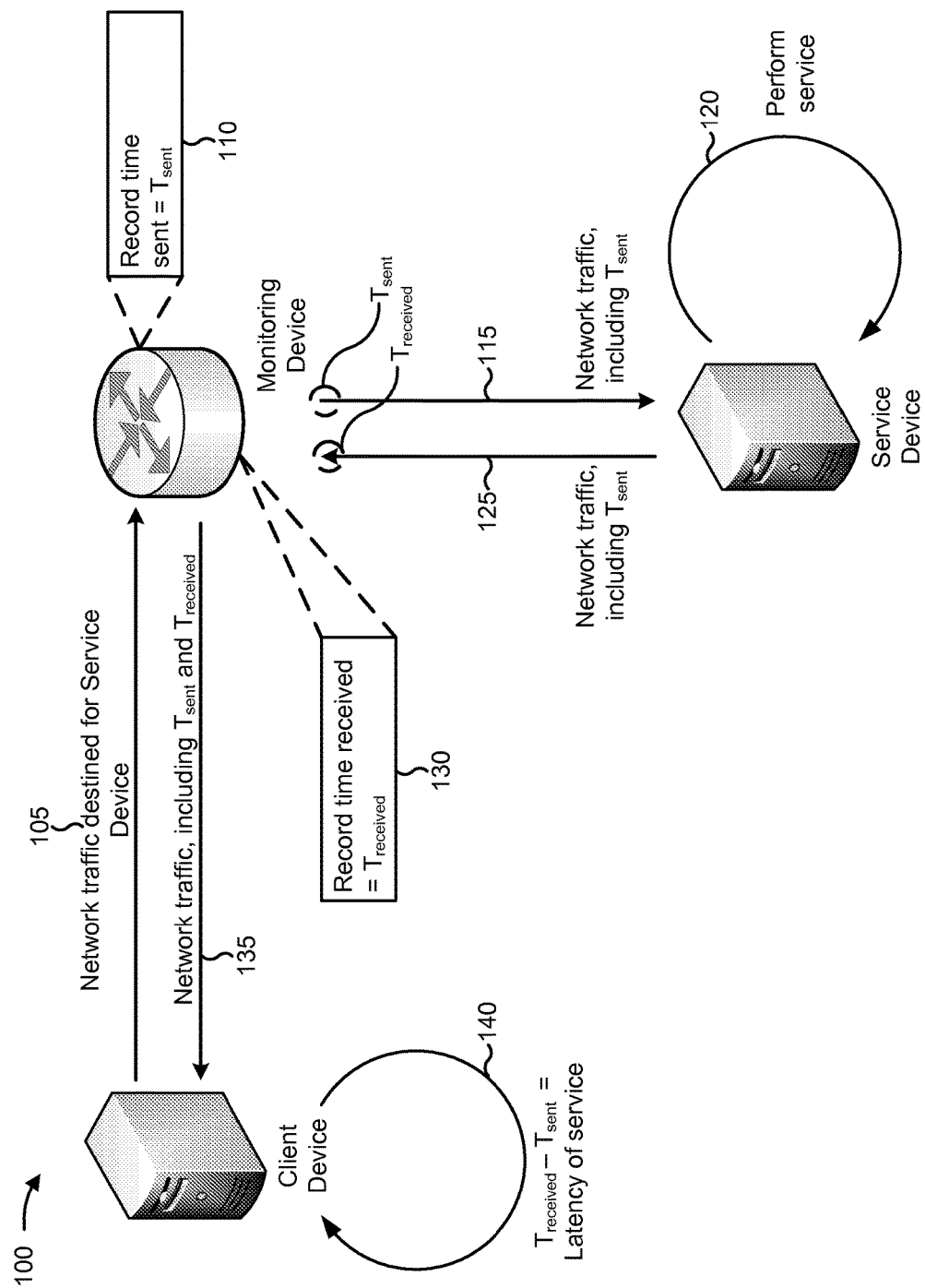
FIG. 1 is a diagram of an overview of an example implementation described herein.

FIG. 1 is a diagram of an overview of an example implementation 100 described herein. For the purpose of example implementation 100, assume that a service provider provides a service via a service device (e.g., a server, a network device, a component of a network device, etc.). Assume that a client device (e.g., a host, a server, a router, etc.) accesses the service via a monitoring device (e.g., a server, a network device, etc.). Assume that the monitoring device offers latency monitoring of the service. Assume further that the client device requests, from the monitoring device, latency monitoring of the service. Assume that the monitoring device establishes a secure communication session with the client device.

As shown in FIG. 1, and by reference number 105, the client device may provide network traffic (e.g., a packet) to the monitoring device, to be transmitted to the service device. As shown, the monitoring device may receive the network traffic. As shown by reference number 110, the monitoring device may record a send time associated with transmitting the network traffic to the service device (e.g., $T_{sent}$). The monitoring device may associate the network traffic with the send time. As shown by reference number 115, the monitoring device may transmit the network traffic and information that identifies the send time to the service device.

As shown, the service device may receive the network traffic and the information that identifies the send time. As shown by reference number 120, the service device may perform the service. As shown by reference number 125, after performing the service, the service device may transmit the network traffic and the information that identifies the send time back to the monitoring device.

As shown, the monitoring device may receive the network traffic. As shown by reference number 130, the monitoring device may record a receipt time associated with receiving the network traffic from the service device (e.g., $T_{received}$). The monitoring device may associate the network traffic with the receipt time. As shown by reference number 135, the monitoring device may transmit the network traffic and information that identifies the associated times (e.g., $T_{sent}$ and $T_{received}$) to the client device. The client device may receive the network traffic and information that identifies the associated times.

As shown by reference number 140, the client device may calculate a latency associated with the service. As shown, the client device may subtract $T_{sent}$ from $T_{received}$ to determine the latency associated with the service. In this way, the client device may receive information related to latency associated with a service. The information related to latency may be transmitted and received via a secure session. The client device may calculate a service latency using the information related to latency.

While example implementation 100 describes the monitoring device recording a time of occurrence of two events (e.g., providing the network traffic to the service device and receiving the network traffic from the service device), in some implementations, the monitoring device may record a time of occurrence of different events and/or additional events (e.g., a time of receiving the network traffic from the client device, a time of providing the network traffic to the client device, or the like). In some implementations, the client device may record a time of occurrence of one or more events (e.g., a time of providing the network traffic to the monitoring device, a time of receiving the network traffic from the monitoring device, or the like). These times may be used by the client device to calculate a total round-trip latency and/or a latency associated with the monitoring device.

In this way, the client device may determine a latency of a provided service based on a two way active measurement protocol. The client device may evaluate the service based on the latency of the service and/or the latency of the monitoring device. Using the latency information provided by the monitoring device, the network operator may improve network efficiency and design the network in a more latency-sensitive manner.

Figure 2:
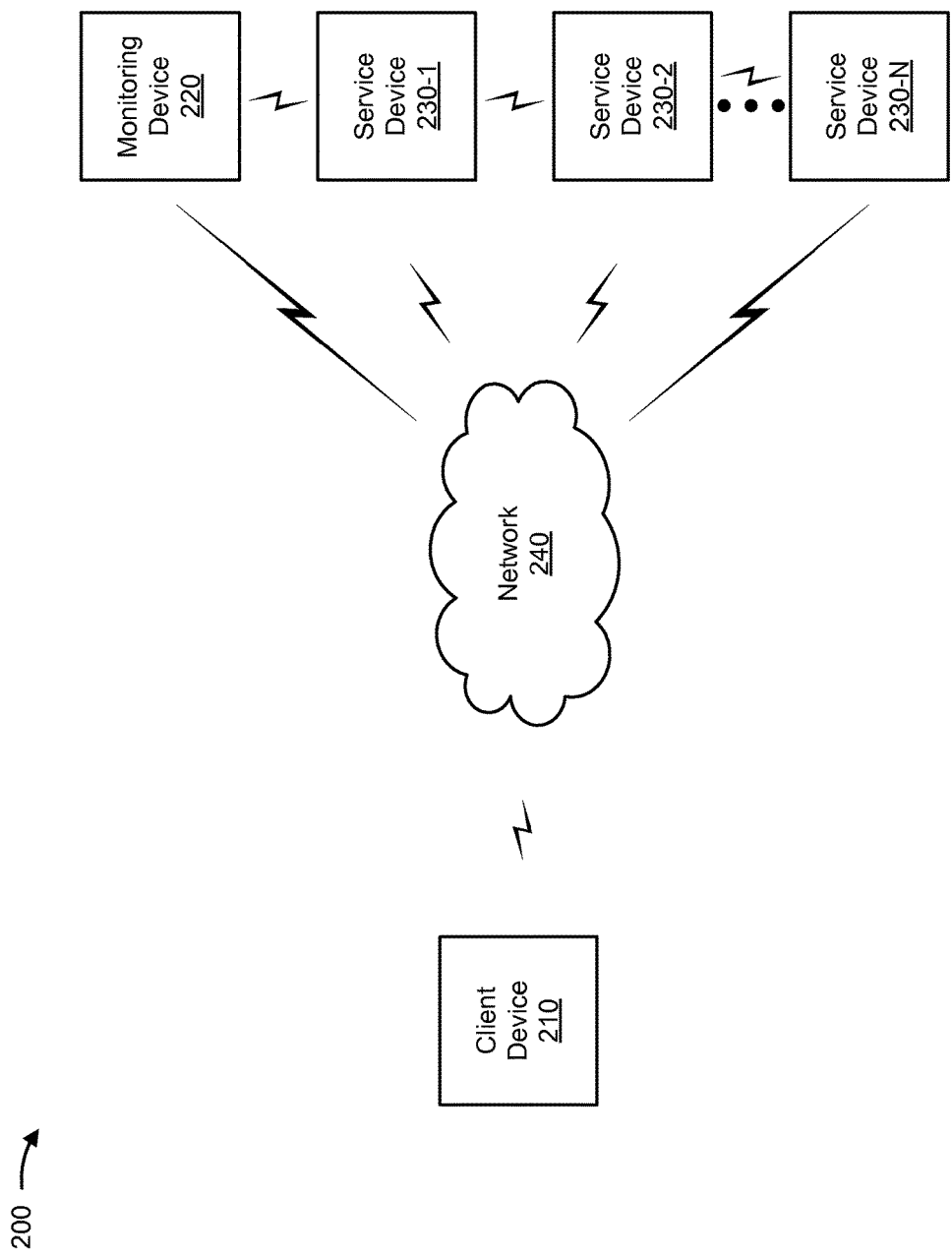
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a monitoring device 220, one or more service devices 230-1 through 230-N (N≥1) (hereinafter referred to individually as "service device 230," and collectively as "service devices 230"), and a network 240. Devices of environment 200 may interconnect via wired connections, wireless connections, or a combination of wired and wireless connections.

Client device 210 may include a device capable of receiving, generating, storing, processing, and/or providing network traffic (e.g., packets). For example, client device 210 may include a host device, a server, a router, a gateway, a modem, or a similar device. In some implementations, client device 210 may establish a communication session with monitoring device 220 (e.g., client device 210 may include a control-client device, as defined in RFC 5357). Client device 210 may be associated with one or more ports for transmitting network traffic to and/or receiving network traffic from monitoring device 220. In some implementations, client device 210 may transmit network traffic to and/or receive network traffic from monitoring device 220 (e.g., client device 210 may include a session-sender device, as defined in RFC 5357). A service may be performed on the network traffic, and client device 210 may determine a latency associated with the service, as described in more detail elsewhere herein.

Monitoring device 220 may include one or more devices capable of receiving, storing, processing, and/or providing network traffic. For example, monitoring device 220 may include a server (e.g., a server, as defined in RFC 5357), a network device, a router, a switch, a gateway, or the like. In some implementations, monitoring device 220 may transmit network traffic to and/or receive network traffic from client device 210 (e.g., monitoring device 220 may include a session-reflector device, as defined in RFC 5357). Monitoring device 220 may assist with measuring a latency of a service performed on the network traffic (e.g., by associating time stamps with the network traffic), as described in more detail elsewhere herein.

Service device 230 may include one or more devices capable of performing a service (e.g., an IPSEC service, a network flow monitoring service (such as JFlow), a deep packet inspection (DPI) service, a carrier-grade network address and protocol translation (CGNAT) service, a subscriber-aware service, a security application service, a traffic load balancing service, a content delivery service, a real-time streaming service, a firewall service, or the like) on network traffic. For example, service device 230 may include a server, a network device, a router, a switch, a gateway, a firewall, or a similar device. In some implementations, service device 230 may be a component of another network device. In some implementations, service device 230 may include one or more ports capable of receiving packets from and/or transmitting packets to monitoring device 220. In some implementations, service device 230 may be included in monitoring device 220. In some implementations, monitoring device 220 may be included in service device 230. In some implementations, service device 230 may be separate from monitoring device 220.

Network 240 may include one or more wired and/or wireless networks. For example, network 240 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
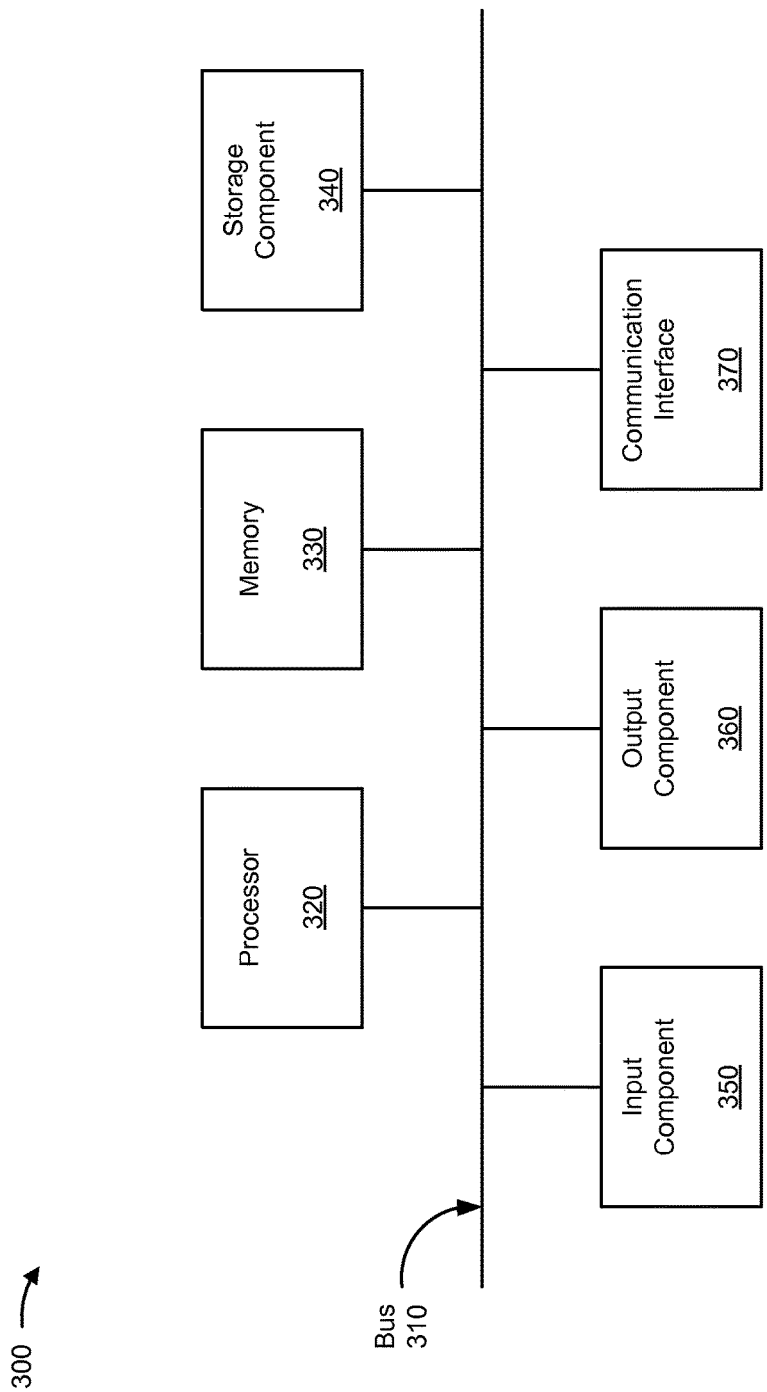
FIG. 3 is a diagram of example components of one or more devices of FIG. 2.

FIG. 3 is a diagram of example components of a device 300. Device 300 may correspond to client device 210, monitoring device 220, and/or service device 230. In some implementations, client device 210, monitoring device 220, and/or service device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
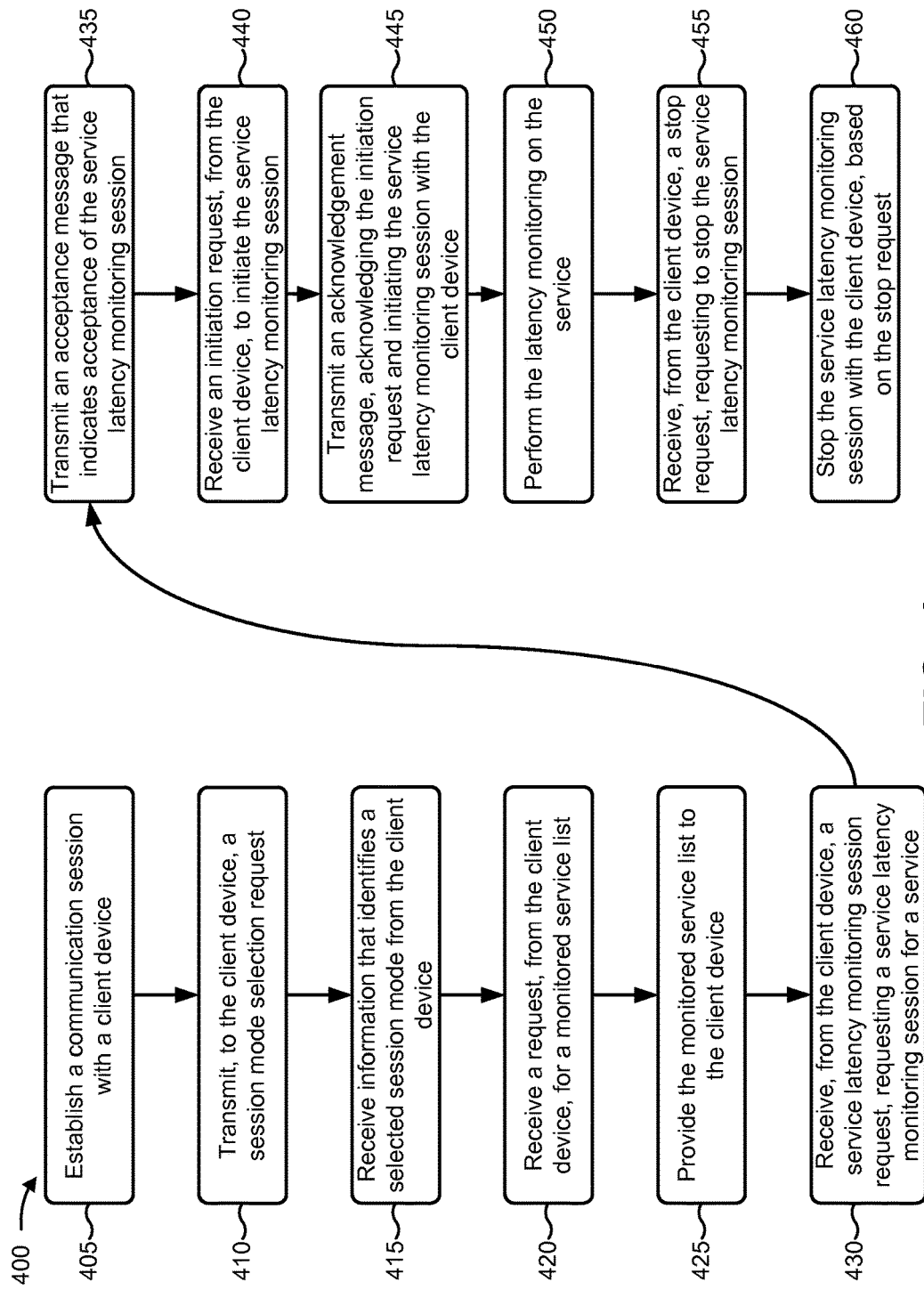
FIG. 4 is a flow chart of an example process for establishing a test session and determining a service to monitor for latency.

FIG. 4 is a flow chart of an example process 400 for establishing a service latency monitoring session and determining a service to monitor for latency. In some implementations, one or more process blocks of FIG. 4 may be performed by monitoring device 220. In some implementations, one or more process blocks of FIG. 4 may be performed by another device or a group of devices separate from or including monitoring device 220, such as client device 210 and/or service device 230.

As shown in FIG. 4, process 400 may include establishing a communication session with a client device (block 405). For example, monitoring device 220 may establish a communication session with client device 210, based on client device 210 initiating the communication session. In some implementations, monitoring device 220 may establish the communication session via a network port associated with the two way active measurement protocol (e.g., port 862). In some implementations, the communication session may include a transmission control protocol (TCP) session. In some implementations, client device 210 may include a TWAMP client, and monitoring device 220 may include a TWAMP server, as defined in RFC 5357.

In some implementations, monitoring device 220 may transmit a greeting message, including a session acceptance indicator (e.g., a string of one or more characters, indicating that monitoring device 220 has accepted the communication session) to client device 210. In some implementations, the greeting message may include a challenge (e.g., a string of characters, determined according to a rule known to client device 210), used by client device 210 to authenticate the greeting message. Additionally, or alternatively, the greeting message may include information (e.g., a security key, or the like) related to encrypting a communication between client device 210 and monitoring device 220.

As further shown in FIG. 4, process 400 may include transmitting, to the client device, a session mode selection request (block 410). For example, monitoring device 220 may transmit, to client device 210, a session mode selection request. The session mode selection request may specify one or more session modes (e.g., an unauthenticated session mode; an authenticated session mode, such as a mode requiring a credential; an encrypted session mode; or the like) supported by monitoring device 220, via which client device 210 may transmit and/or receive network traffic related to service latency monitoring. In some implementations, the session mode selection request may specify one or more session modes that support service latency monitoring (e.g., an unauthenticated session mode that supports service latency monitoring, an authenticated session mode that supports service latency monitoring, an encrypted session mode that supports service latency monitoring, or the like). In some implementations, the session mode selection request may specify a session mode identifier, corresponding to a session mode, to identify the session mode.

As further shown in FIG. 4, process 400 may include receiving information that identifies a selected session mode from the client device (block 415). For example, client device 210 may select a session mode from the one or more session modes specified by the session mode selection request. Client device 210 may transmit, to monitoring device 220, information that identifies the selected session mode. Monitoring device 220 may receive, from client device 210, information that identifies the selected session mode (e.g., a session mode identifier). The selected session mode may support service latency monitoring. In that case, monitoring device 220 may perform service latency monitoring on the service.

In some implementations, client device 210 may identify a session mode that requires authentication of communications transmitted via the communication session. In that case, client device 210 may provide, with the information that identifies the selected session mode, a security key, for use by client device 210 and/or monitoring device 220 to authenticate messages transmitted via the communication session (e.g., by a keyed-hash message authentication method, or the like). For example, client device 210 may identify an authenticated session mode, and may provide a security key to monitoring device 220. When transmitting a message via the authenticated session, a message transmitter (e.g., client device 210 and/or monitoring device 220) may associate a keyed-hash message authentication code (HMAC) with a transmitted message. The recipient of the transmitted message may use the security key provided by the message transmitter and the HMAC to authenticate the transmitted message. In this way, client device 210 and/or monitoring device 220 may improve the security of the communication session by verifying the authenticity of messages transmitted via the communication session.

In some implementations, client device 210 may identify a session mode that requires encryption of communications transmitted via the communication session. In that case, client device 210 may provide, with the information that identifies the selected session mode, a security key, for use by monitoring device 220 to encrypt messages transmitted via the communication session. For example, client device 210 may identify an encrypted session mode, and may provide a security key to monitoring device 220. Monitoring device 220, when transmitting a message to client device 210, may use the security key to encrypt part or all of the message. Upon receiving the message, client device 210 may use the security key to decrypt the message. In this way, client device 210 and/or monitoring device 220 may improve the security of the communication session by encrypting messages transmitted via the communication session.

In some implementations, monitoring device 220 may close the communication session (e.g., based on receiving a session mode identifier from client device 210 that identifies an invalid session mode, based on determining that client device 210 is not permitted to open the communication session, based on an internal error associated with monitoring device 220, based on an insufficient resource associated with monitoring device 220, or the like). In this case, monitoring device 220 may transmit a message, including a session ending indicator (e.g., a string of one or more characters indicating that monitoring device 220 has ended the communication session), to client device 210. In some implementations, the session ending indicator may indicate a reason for closing the communication session. In some implementations, client device 210 may close the communication session (e.g., based on determining that monitoring device 220 did not specify a desired session mode, or the like). In that case, client device 210 may transmit a session ending indicator to monitoring device 220, indicating that client device 210 has closed the communication session.

As further shown in FIG. 4, process 400 may include receiving a request, from the client device, for a monitored service list (block 420). For example, monitoring device 220 may receive, from client device 210, a request for a monitored service list (e.g., a request service-supported message). The monitored service list may identify one or more services for which monitoring device 220 may provide service latency monitoring. Client device 210 may request the monitored service list based on identifying a session mode that supports service latency monitoring.

As further shown in FIG. 4, process 400 may include providing the monitored service list to the client device (block 425). For example, monitoring device 220 may provide the monitored service list to client device 210 (e.g., in a response service-supported message). The monitored service list may include a service quantity indicator that indicates a quantity of services supported by monitoring device 220 for service latency monitoring (e.g., an integer); one or more service description strings describing the one or more services; one or more service identifiers (e.g., a string of characters of any length) that identify the one or more services for which service latency monitoring is supported;

a session identifier to identify a session (e.g., a string of one or more characters, determined by monitoring device 220), or the like.

In some implementations, monitoring device 220 may provide the monitored service list to client device 210 without receiving the request for the monitored service list. For example, assume that client device 210 has identified a session mode that supports service latency monitoring. Monitoring device 220 may provide the monitored service list to client device 210 based on the identified session mode supporting service latency monitoring. In this way, monitoring device 220 may reduce network traffic by not requiring client device 210 to request the monitored service list.

As further shown in FIG. 4, process 400 may include receiving, from the client device, a service latency monitoring session request, requesting a service latency monitoring session for a service (block 430). For example, monitoring device 220 may receive, from client device 210, a service latency monitoring session request, requesting a service latency monitoring session. In some implementations, the request may identify a sender port (e.g., a network port associated with client device 210, from which monitoring device 220 may receive network traffic), a receiver port (e.g., a network port associated with client device 210, to which monitoring device 220 may transmit network traffic), a sender address (e.g., a network address associated with client device 210), a receiver address (e.g., a network address associated with monitoring device 220), a start time (e.g., a time at which monitoring device 220 may start the service latency monitoring session), one or more service identifiers, a timeout threshold (e.g., a length of time for which monitoring device 220 may continue the test session, after receiving a request to end the test session), or the like. In some implementations, client device 210 may request one or more service latency monitoring sessions for one or more services.

As further shown in FIG. 4, process 400 may include transmitting an acceptance message that indicates acceptance of the service latency monitoring session (block 435). For example, monitoring device 220 may transmit an acceptance message to client device 210, indicating acceptance of the service latency monitoring session. The acceptance message may include an acceptance indicator (e.g., an integer, a string of characters of any length, or the like, that indicates acceptance of the service latency monitoring session), a port number (e.g., a network port associated with monitoring device 220, via which to provide the service latency monitoring session to client device 210), a server identifier (e.g., a string of characters of any length, generated by monitoring device 220, used to identify monitoring device 220), or the like.

In some implementations, monitoring device 220 may transmit a session denial message that indicates denial of the service latency monitoring session. For example, monitoring device 220 may deny the service latency monitoring session requested by client device 210 (e.g., due to an insufficient resource associated with monitoring device 220, an error in the service latency monitoring session request, an internal error associated with monitoring device 220, or the like). The session denial message may indicate a reason for the denial of the service latency monitoring session. In some implementations, monitoring device 220 may close the communication session with client device 210, based on denying the service latency monitoring session.

As further shown in FIG. 4, process 400 may include receiving an initiation request, from the client device, to initiate the service latency monitoring session (block 440). For example, after accepting the service latency monitoring session, monitoring device 220 may receive, from client device 210, an initiation request to initiate the service latency monitoring session. In some implementations, the initiation request may include an initiation request identifier (e.g., an integer, a string of characters of any length, or the like, that identifies the initiation request).

As further shown in FIG. 4, process 400 may include transmitting an acknowledgment message, acknowledging the initiation request and initiating the service latency monitoring session with the client (block 445). For example, monitoring device 220 may provide an acknowledgment message, via the communication session, to client device 210, based on receiving the initiation request. The acknowledgment message may include an acknowledgment indicator, indicating acknowledgment of the initiation request. Monitoring device 220 may initiate the service latency monitoring session, via the network port specified in the acceptance message, with client device 210.

As further shown in FIG. 4, process 400 may include performing the latency monitoring on the service (block 450). For example, monitoring device 220 may monitor the latency associated with a service provided by service device 230, as described in more detail in connection with FIG. 6.

As further shown in FIG. 4, process 400 may include receiving, from the client device, a stop request, requesting to stop the service latency monitoring session (block 455). For example, monitoring device 220 may receive, from client device 210, a stop request, requesting that monitoring device 220 stop the service latency monitoring session. In some implementations, the stop request may include a completion indicator, to indicate a completion status (e.g., a normal completion; an abnormal completion, such as a completion before an expected time of completion; a failure associated with the latency monitoring service; a failure associated with client device 210; or the like), a client active session identifier (e.g., an identifier, indicating a quantity of active service latency monitoring sessions associated with client device 210), or the like.

In some implementations, the stop request may include a client active session identifier. Monitoring device 220 may compare the client active session identifier with a server active session identifier (e.g., an identifier, indicating a quantity of active service latency monitoring sessions associated with client device 210, according to monitoring device 220). A quantity difference between the client active session identifier and the server active session identifier may indicate an error in the service latency monitoring session (e.g., that client device 210 failed to properly request a session, that monitoring device 220 failed to initiate and/or end a session, or the like). Monitoring device 220 may discard latency information gathered during the service latency monitoring session based on the quantity difference (e.g., monitoring device 220 may discard one or more time stamps, service latency information, session configuration information, or the like). In some implementations, monitoring device 220 may transmit an error message to client device 210, indicating the quantity difference between the client active session identifier and the service active session number. In this way, monitoring device 220 may improve the accuracy of information gathered during the service latency monitoring session.

As further shown in FIG. 4, process 400 may include stopping the service latency monitoring session with the client device, based on the stop request (block 460). For example, monitoring device 220 may stop the service latency monitoring session with client device 210, based on the stop request. In some implementations, monitoring device 220 may continue the service latency monitoring session for a period of time (e.g., the timeout threshold, if client device 210 specified the timeout threshold in the session request), and/or until a condition is met (e.g., until all monitored network traffic has been provided to client device 210). In that case, monitoring device 220 may stop the service latency monitoring session after the period of time has elapsed and/or the condition has been met. In this way, monitoring device 220 may complete latency monitoring of network traffic transmitted before the stop request was received by monitoring device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of establishing a service latency monitoring session and determining a service to monitor for latency.

Figure 5A:
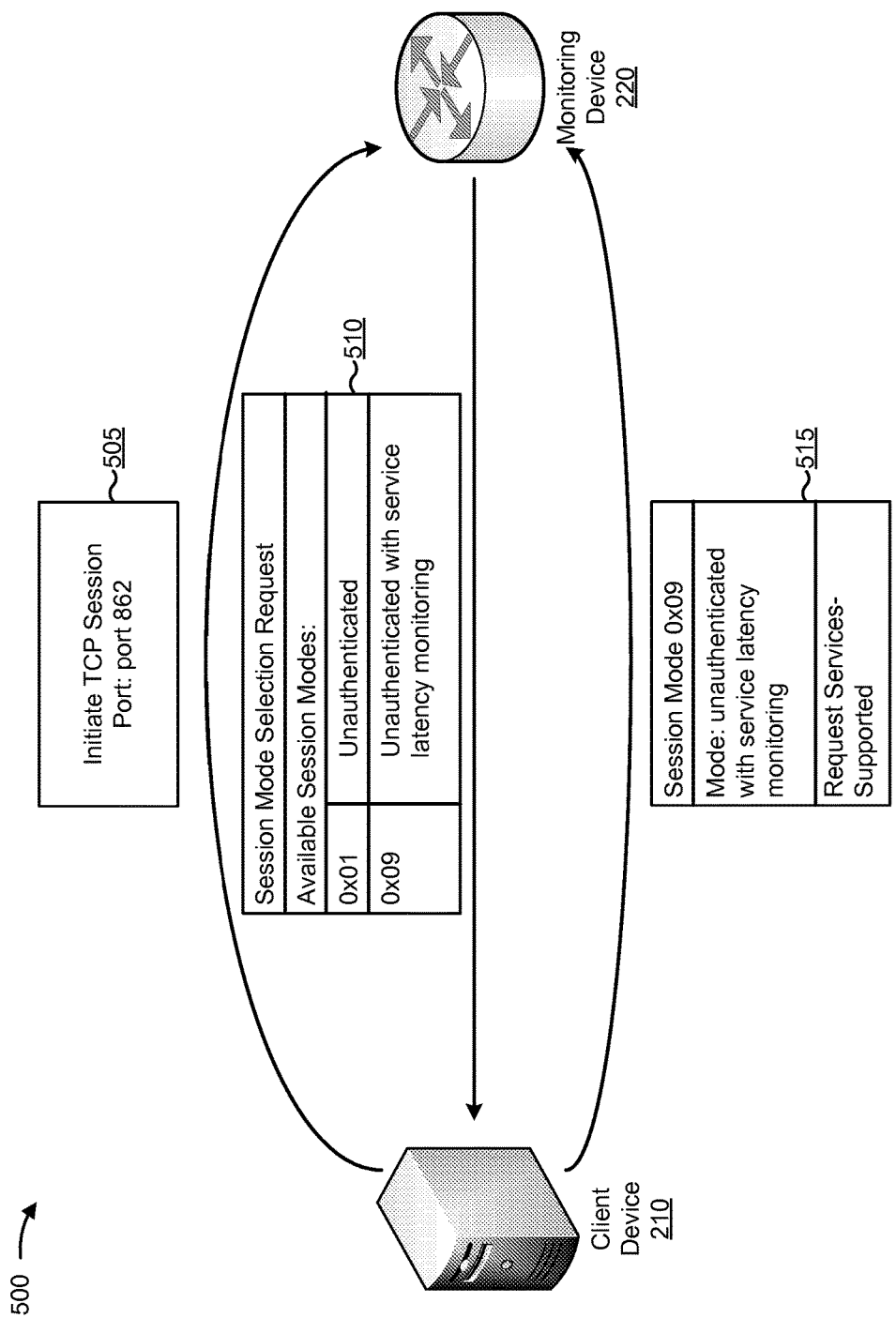
FIGS. 5A-5D are diagrams of an example implementation relating to the example process shown in FIG. 4.

For the purpose of FIG. 5A, assume that monitoring device 220 is associated with a network port (here, port 862). As shown in FIG. 5A and by reference number 505, client device 210 may establish a TCP session with monitoring device 220 via port 862. As shown by reference number 510, monitoring device 220 may transmit a session mode selection request to client device 210. As further shown, the session mode selection request may indicate one or more session modes (here, an unauthenticated session mode, and an unauthenticated session mode that supports service latency monitoring), and/or one or more session mode identifiers associated with the one or more session modes (here, the session mode identifier 0x01 is associated with the unauthenticated session mode, and the session mode identifier 0x09 is associated with the unauthenticated session mode that supports service latency monitoring).

As shown by reference number 515, monitoring device 220 may receive, from client device 210, a session mode identifier (here, 0x09). As shown, the session mode identifier corresponds to the unauthenticated session mode that supports latency monitoring. As further shown, monitoring device 220 may receive, from client device 210, a request for a monitored service list (here, Request Services-Supported).

Figure 5B:
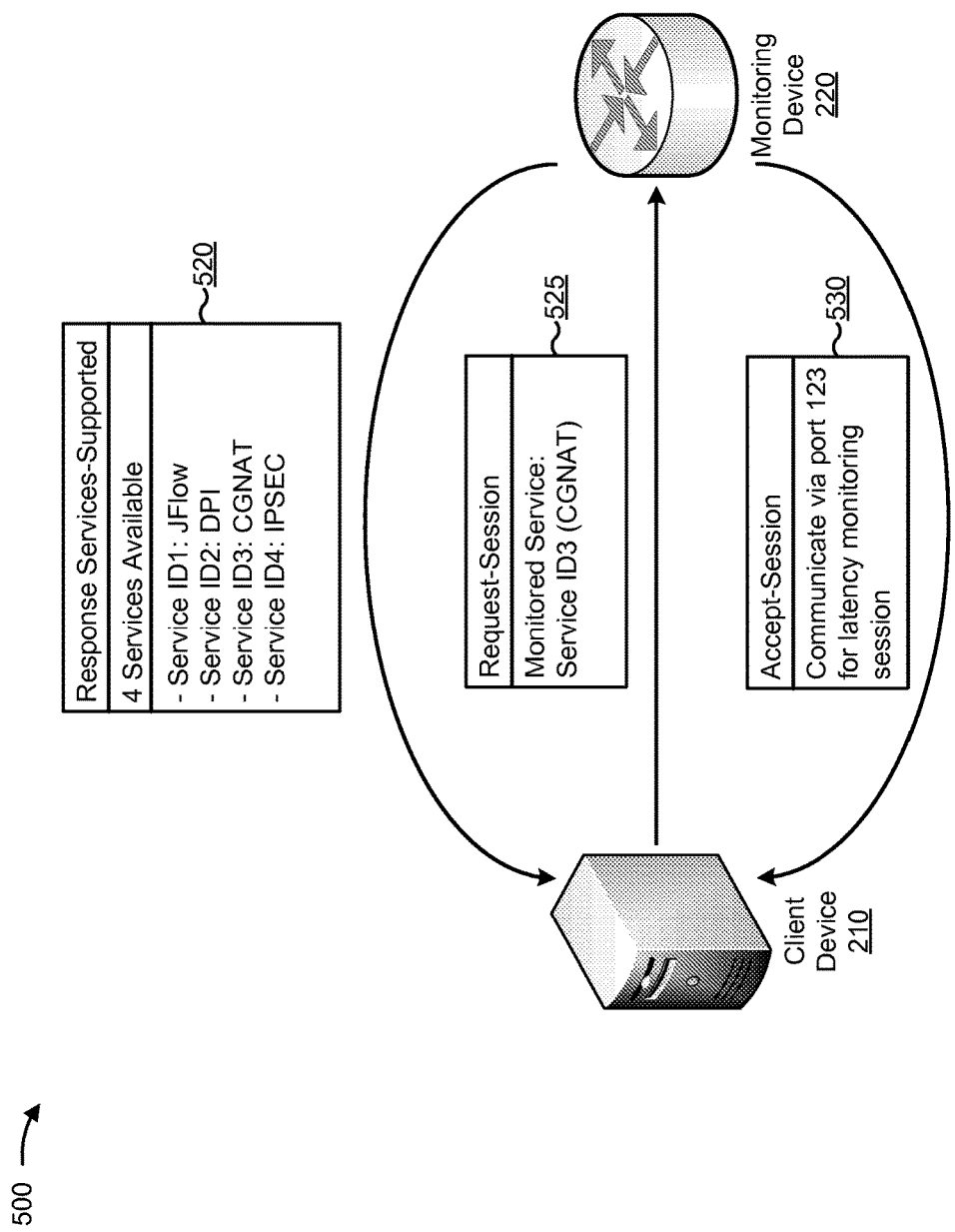

For the purpose of FIG. 5B, assume that the TCP session between client device 210 and monitoring device 220 is active. As shown in FIG. 5B, and by reference number 520, monitoring device 220 may provide the monitored service list to client device 210, based on receiving the request for the monitored service list (here, Response Services-Supported). As shown, the monitored service list may include one or more service identifiers (here, ID1, ID2, ID3, and ID4) associated with one or more services (here, JFlow, DPI, CGNAT, and IPSEC) that monitoring device 220 is capable of monitoring.

As shown by reference number 525, monitoring device 220 may receive, from client device 210, a service latency monitoring session request, requesting a service latency monitoring session (here, Request-Session). As further shown, the service latency monitoring session request may include a service identifier (here, ID3), corresponding to a service (here, CGNAT) for which client device 210 has request latency monitoring. As shown by reference number 530, monitoring device 220 may transmit, to client device 210, an acceptance message (here, Accept-Session). As shown, the acceptance message may indicate a network port (here, port 123) via which to establish the service latency monitoring session.

Figure 5C:
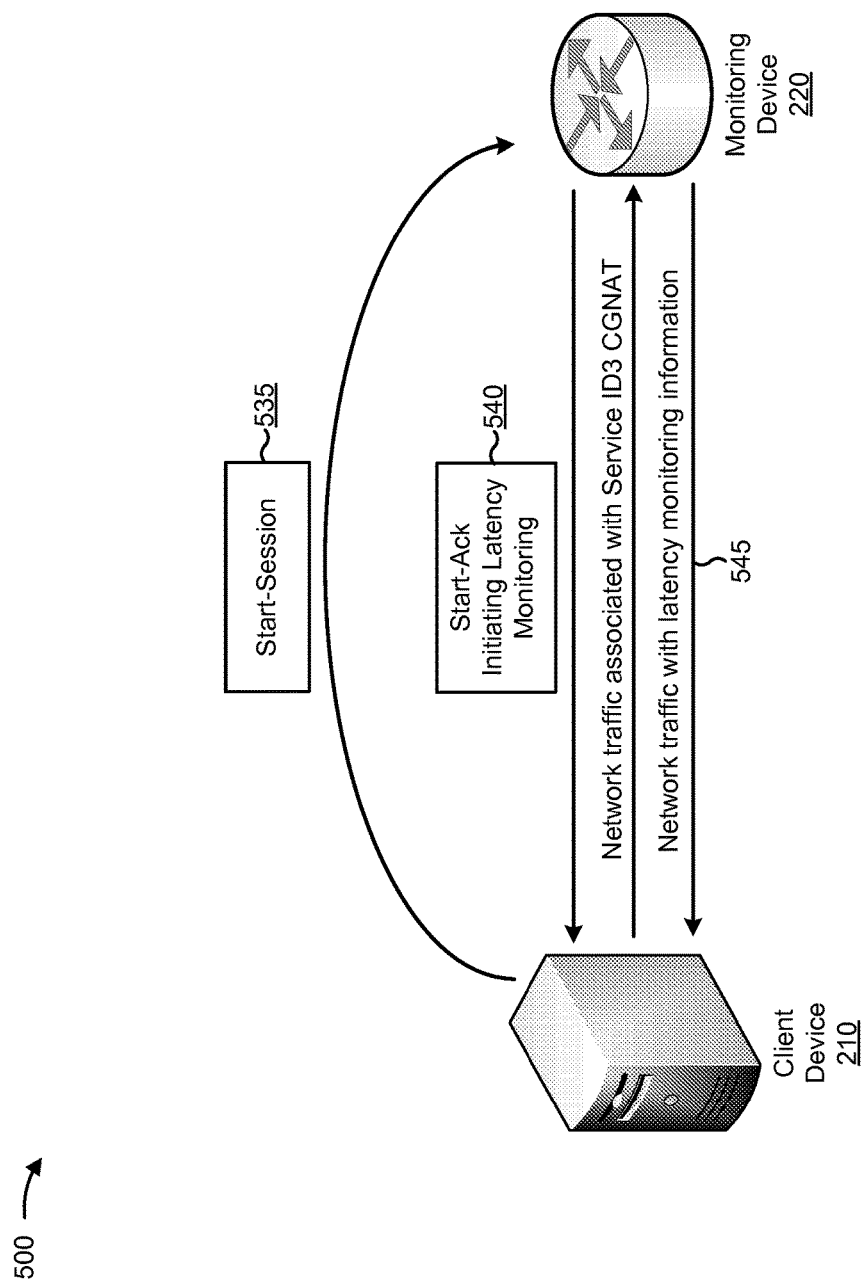

As shown in FIG. 5C, and by reference number 535, monitoring device 220 may receive, from client device 210, an initiation request (here, Start-Session), requesting that monitoring device 220 initiate the service latency monitoring session. As shown by reference number 540, monitoring device 220 may transmit an acknowledgment message (here, Start-Ack), acknowledging the initiation request. Assume that monitoring device 220 initiates the service latency monitoring session. As shown by reference number 545, monitoring device 220 may receive network traffic associated with the CGNAT service, identified by service ID3. Assume that monitoring device 220 performs the latency monitoring service after receiving the network traffic, as described in more detail elsewhere herein. As shown, monitoring device 220 may provide the network traffic, and information related to latency monitoring, to client device 210.

Figure 5D:
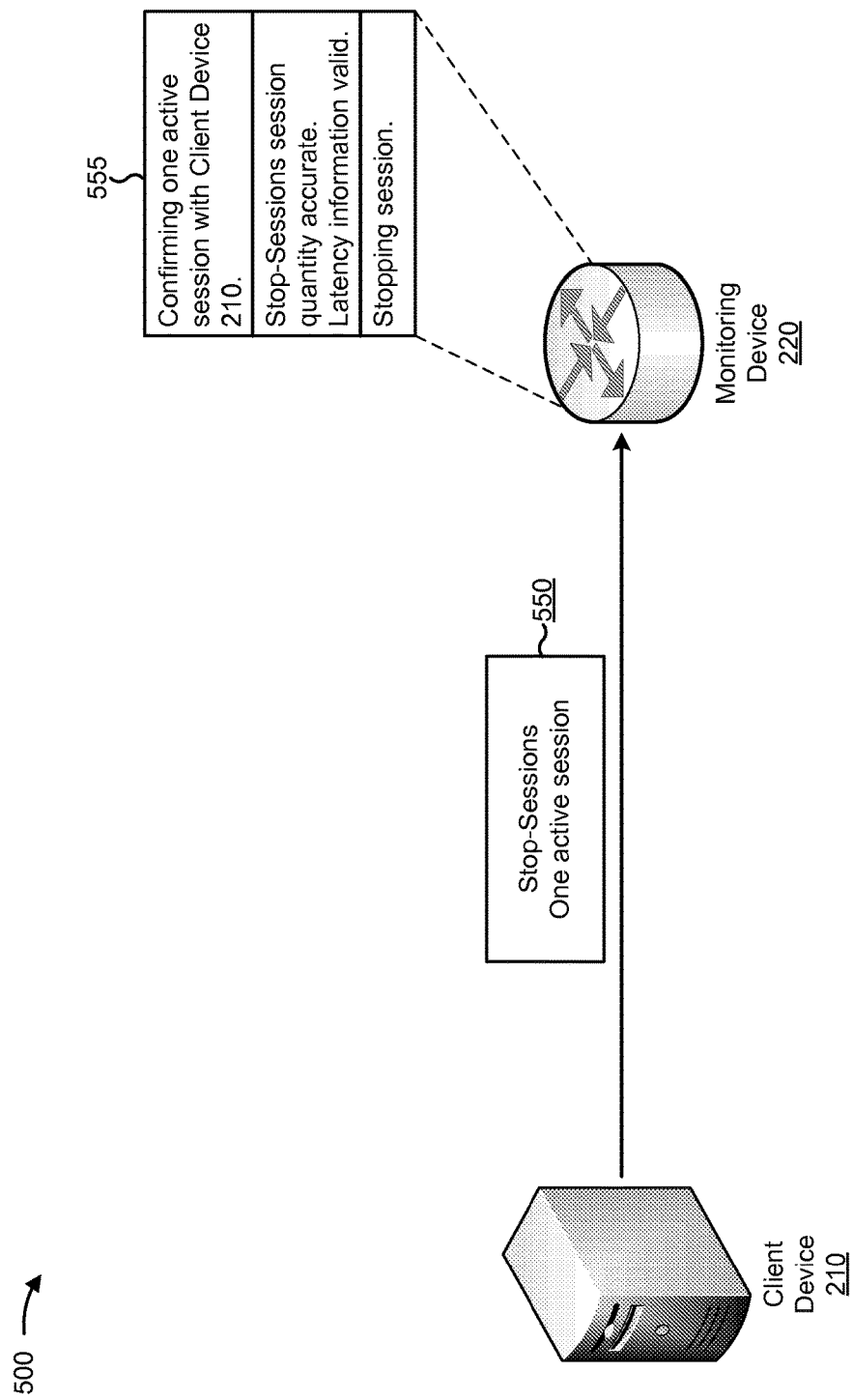

As shown in FIG. 5D, and by reference number 550, monitoring device 220 may receive, from client device 210, a stop request (here, Stop-Sessions), requesting that monitoring device 220 stop the service latency monitoring session. As shown, the stop request may specify a client active session identifier associated with client device 210.

As shown by reference number 555, TWAMP sever device 220 may determine a server active session identifier associated with client device 210. As shown, monitoring device 220 may determine that the client active session identifier matches the server active session identifier. As shown, monitoring device 220 may determine, based on determining that the client active session identifier matches the server active session identifier, that the information related to latency monitoring is valid. As shown, monitoring device 220 may stop the service latency monitoring session.

As indicated above, FIGS. 5A-5D are provided merely as an example. Other examples are possible and may differ from what was described with regard to FIGS. 5A-5D.

Figure 6:
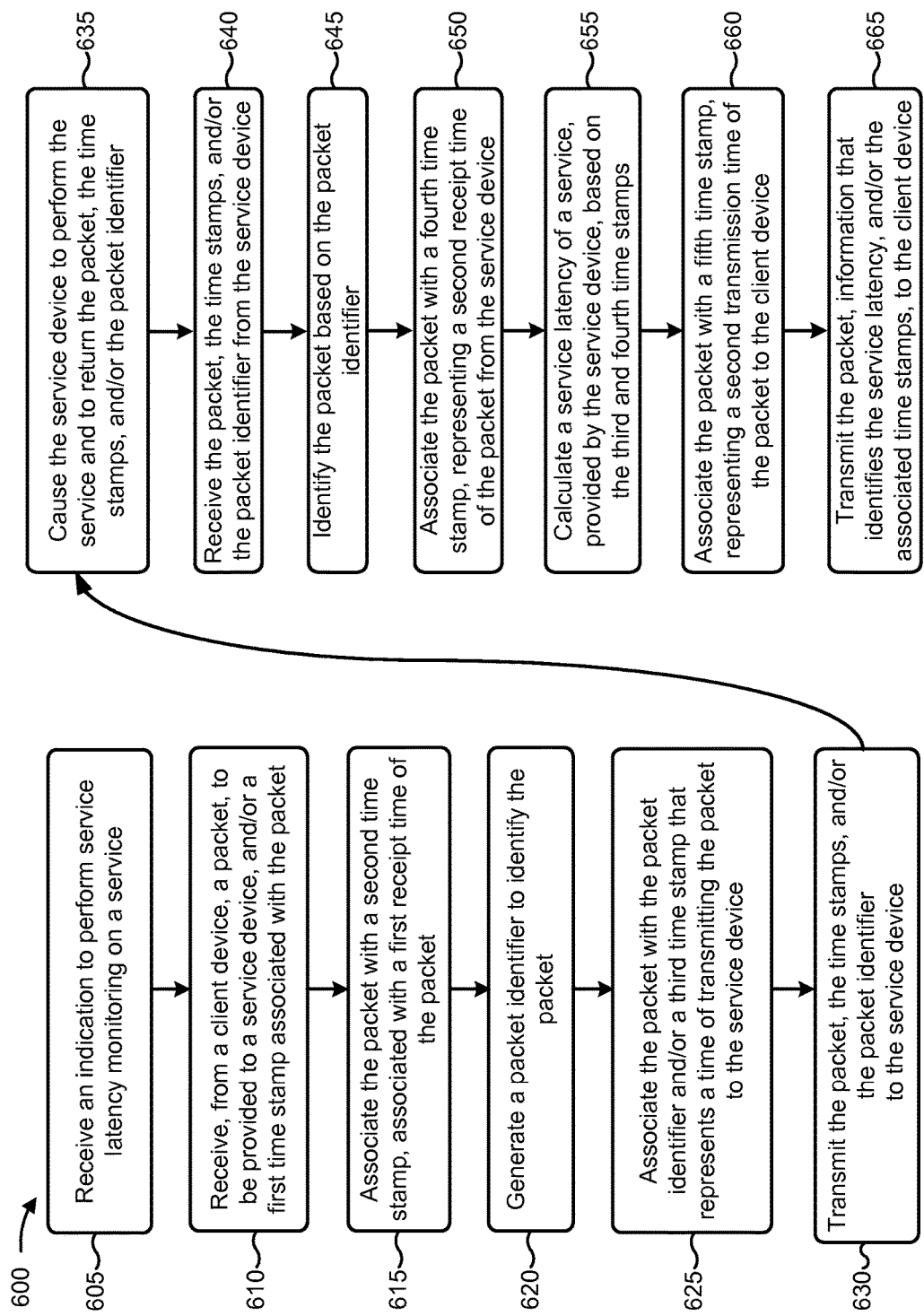
FIG. 6 is a flow chart of an example process for monitoring latency of a service.

FIG. 6 is a flow chart of an example process 600 for monitoring latency of a service. In some implementations, one or more process blocks of FIG. 6 may be performed by monitoring device 220. In some implementations, one or more process blocks of FIG. 6 may be performed by another device or a group of devices separate from or including monitoring device 220, such as client device 210 and/or service device 230.

As shown in FIG. 6, process 600 may include receiving an indication to perform service latency monitoring on a service (block 605). For example, monitoring device 220 may establish a communication session with client device 210. Monitoring device 220 may receive, via the communication session, information that identifies a session mode that supports service latency monitoring. Monitoring device 220 may establish a service latency monitoring session with client device 210. Monitoring device 220 may receive, from client device 210 and via the communication session, an indicator to perform service latency monitoring on a service. In some implementations, the indicator may indicate that monitoring device 220 is to perform service latency monitoring on one or more services.

As further shown in FIG. 6, process 600 may include receiving, from a client device, a packet, to be provided to a service device, and a first time stamp associated with the packet (block 610). For example, monitoring device 220 may receive, from client device 210 and via the service latency monitoring session, a packet (e.g., a data packet).

The packet may be associated with a first time stamp (sometimes referred to herein as time stamp 1). The first time stamp may represent a transmission time at which client device 210 transmits the packet to monitoring device 220. In some implementations, the packet may include a first error estimator (e.g., a number, such as a real number), to estimate an error associated with the first time stamp (e.g., if the time stamp was applied by a device associated with a different timekeeping mechanism than monitoring device 220, or for some other reason).

In some implementations, the packet may include information that identifies a source associated with the packet (e.g., a source media access control (MAC) address, a source IP address, etc.), a destination associated with the packet (e.g., a destination MAC address, a destination IP address, etc.), information that identifies a manner in which the packet is to be processed (e.g., a class associated with the packet, etc.) and/or other information associated with processing, forwarding, and/or providing the packet.

In some implementations, the packet may include a service protocol data unit (PDU). The service PDU may identify the service to be performed on the packet (e.g., by a description of the service, a service identifier, an address associated with the service, such as a network address, or the like). In some implementations, monitoring device 220 may route the packet to service device 230 based on the service PDU.

In some implementations, the packet may be associated with a TWAMP header. The TWAMP header may include information identifying the packet, such as a sequence number (e.g., a number, identifying a relative position of the packet in a sequence of packets), a time to live (e.g., a time, identifying a time associated with an expiration of the packet), information identifying a source, information identifying a destination, or the like. The TWAMP header may indicate that the packet is associated with the service latency monitoring session. In some implementations, the TWAMP header may be generated by client device 210.

In some implementations, client device 210 may generate a mirror packet for use by monitoring device 220 to monitor the latency of the service. The mirror packet may be generated by client device 210, based on a service packet to be routed to service device 230. In other words, the mirror packet may be generated based on an existing service packet. For example, assume client device 210 has generated a service packet, to be transmitted to monitoring device 220, for routing to service device 230. Assume further that client device 210 requests service latency monitoring of the service associated with the service packet. Client device 210 may generate a mirror packet, based on the service packet. Client device 210 may associate the mirror packet with a TWAMP header, and/or may provide the mirror packet to monitoring device 220 for service latency monitoring.

In some implementations, client device 210 may generate a test packet, for use by monitoring device 220 to monitor the latency of the service. The test packet may be generated by client device 210, based on a service performed by service device 230 (e.g., the test packet may be generated to match one or more characteristics of an input packet of the service). For example, assume client device 210 requests service latency monitoring of a service provided by service device 230. Assume further that client device 210 has not generated a service packet associated with the service. Client device 210 may generate a test packet based on one or more characteristics of an input packet of the service. Client device 210 may associate the test packet with a TWAMP header, and/or may provide the test packet to monitoring device 220 for latency service monitoring.

As further shown in FIG. 6, process 600 may include associating the packet with a second time stamp, associated with a first receipt time of the packet (block 615). For example, monitoring device 220 may receive the packet at a first receipt time. Based on receiving the packet, monitoring device 220 may associate the packet with a second time stamp (sometimes referred to herein as time stamp 2), that represents the first receipt time.

As further shown in FIG. 6, process 600 may include generating a packet identifier to identify the packet (block 620). For example, after receiving the packet, monitoring device 220 may remove the TWAMP header from the packet. Monitoring device 220 may generate a packet identifier (e.g., a cookie), based on the TWAMP header, to identify the packet. The packet identifier may include some or all of the information included in the TWAMP header, and/or may include information identifying the packet. Monitoring device 220 may store the packet identifier and/or the TWAMP header.

As further shown in FIG. 6, process 600 may include associating the packet with the packet identifier and/or a third time stamp, that represents a time of transmitting the packet to the service device (block 625). For example, monitoring device 220 may associate the packet with the packet identifier and/or a third time stamp (sometimes referred to herein as time stamp 3). The third time stamp may represent a time at which monitoring device 220 transmits the packet to service device 230.

As further shown in FIG. 6, process 600 may include transmitting the packet, the time stamps, and/or the packet identifier to the service device (block 630). For example, monitoring device 220 may transmit the packet, time stamps 1, 2, and 3, and the packet identifier to service device 230. In some implementations, monitoring device 220 may transmit the packet to service device 230 based on the TWAMP header, the packet identifier, and/or the session request. In some implementations, monitoring device 220 may transmit the packet and the packet identifier to service device 230, but not time stamps 1, 2, and/or 3. In that case, monitoring device 220 may store time stamps 1, 2, and/or 3.

As further shown in FIG. 6, process 600 may include causing the service device to perform the service and to return the packet, the time stamps, and/or the packet identifier (block 635). For example, after receiving the packet, service device 230 may remove the packet identifier from the packet. Service device 230 may store the packet identifier. Service device 230 may perform the service on the packet (e.g., an IPSEC service, a network flow monitoring service, a DPI service, a CGNAT service, a subscriber-aware service, a security service, a traffic load balancing service, a content delivery service, a real time streaming service, a firewall service, or the like). In some implementations, monitoring device 220 may cause service device 230 to perform the service. After performing the service, service device 230 may associate the packet identifier with the packet (e.g., by appending the packet identifier to the packet, by encapsulating the packet with the packet identifier, by storing the packet identifier in a header of the packet, or the like). Service device 230 may transmit the packet and the packet identifier to monitoring device 220. In some implementations, monitoring device 220 may cause service device 230 to return the packet, the time stamps, and/or the packet identifier to monitoring device 220. The time stamps generated during the service latency monitoring session may assist client device 210 in determining a service latency associated with the service performed by service device 230.

In some implementations, client device 210 may request service latency monitoring of multiple, different services. For example, client device 210 may request service latency monitoring on the IPSEC service, the DPI service, and the CGNAT service. The IPSEC service, the DPI service, and the CGNAT service may be performed by one or more service devices 230. In that case, monitoring device 220, after receiving the packet and associating the packet with the packet identifier and time stamps 1, 2, and 3, may transmit the packet to the one or more service devices 230 for performance of the service. The service devices 230 may remove the packet identifier from the packet, and may store the packet identifier. After performing the IPSEC service, the DPI service, and the CGNAT service, the one or more service devices 230 may associate the packet identifier with the packet, and may transmit the packet, time stamps 1, 2, and 3, and/or the packet identifier to monitoring device 220. In this way, client device 210 may determine a service latency associated with multiple, different services.

As further shown in FIG. 6, process 600 may include receiving the packet, the time stamps, and/or the packet identifier from the service device (block 640). For example, monitoring device 220 may receive the packet, time stamps 1, 2, and 3, and the packet identifier from service device 230, after service device 230 performs one or more services. In some implementations, monitoring device 220 may receive the packet and the packet identifier from service device 230, but not time stamps 1, 2, and/or 3 (e.g., if monitoring device 220 did not transmit time stamps 1, 2, and/or 3 to service device 230). In that case, monitoring device 220 may have stored time stamps 1, 2, and/or 3, and may identify time stamps 1, 2, and/or 3 based on the packet and/or the packet identifier.

As further shown in FIG. 6, process 600 may include identifying the packet based on the packet identifier (block 645). For example, after receiving the packet, time stamps 1, 2, and 3, and the packet identifier from service device 230, monitoring device 220 may compare the packet identifier received in association with the packet, to the packet identifier and/or the TWAMP header stored by monitoring device 220. In this way, monitoring device 220 may identify the packet, based on the packet identifier.

As further shown in FIG. 6, process 600 may include associating the packet with a fourth time stamp, representing a second receipt time of the packet from the service device (block 650). For example, monitoring device 220 may receive the packet from service device 230, and may associate a fourth time stamp (sometimes referred to herein as time stamp 4) with the packet. The fourth time stamp may represent a second receipt time at which monitoring device 220 receives the packet from service device 230.

As further shown in FIG. 6, process 600 may include calculating a service latency of a service, provided by the service device, based on the third and fourth time stamps (block 655). For example, monitoring device 220 may determine the service latency, by subtracting a value indicated by the third time stamp from a value indicated by the fourth time stamp. In some implementations, monitoring device 220 may store information that identifies the service latency, and/or may provide the information that identifies the service latency to client device 210. In this way, monitoring device 220 may gather information related to one or more service latencies, and may decrease the processing requirements of client device 210. Using the information gathered, the network operator may design the network in a more efficient and latency-sensitive manner.

As further shown in FIG. 6, process 600 may include associating the packet with a fifth time stamp, representing a second transmission time of the packet to the client device (block 660). For example, monitoring device 220 may associate the packet with a fifth time stamp (sometimes referred to herein as time stamp 5), that represents a second transmission time at which monitoring device 220 transmits the packet to client device 210. In some implementations, monitoring device 220 may associate the packet with a second error estimator. The second error estimator may estimate an error associated with time stamps 2, 3, 4, and/or 5 (e.g., if the time stamp was applied by a device associated with a different timekeeping mechanism than monitoring device 220, to account for a delay between an event occurring and monitoring device 220 generating a time stamp based on the event, or for some other reason). In some implementations, monitoring device 220 may remove the packet identifier from the packet. In this way, monitoring device 220 may reduce the size of the packet to be transmitted.

As further shown in FIG. 6, process 600 may include transmitting the packet, information that identifies the service latency, and/or the associated time stamps, to the client device (block 665). For example, monitoring device 220 may associate the packet and the information that identifies the service latency and/or time stamps 1, 2, 3, 4, and/or 5 (e.g., by appending the information to the packet, encapsulating the packet with the information, storing the information in a header of the packet, or the like). In some implementations, monitoring device 220 may associate the packet and other information, such as the first and/or second error estimator, information identifying the source and/or the destination, the session identifier, or the like. In this way, monitoring device 220 may assist client device 210 in identifying the packet and/or In some implementations, client device 210 may associate a sixth time stamp with the packet. The sixth time stamp (sometimes referred to herein as time stamp 6) may represent a time at which client device 210 receives the packet from monitoring device 220.

In some implementations, client device 210 may calculate a total round trip time of the packet. For example, client device 210 may calculate the total round trip time by subtracting a value represented by the first time stamp from a value represented by the sixth time stamp. In this way, client device 210 may determine a total elapsed time between transmitting the packet to monitoring device 220 and receiving the packet from monitoring device 220.

Additionally, or alternatively, client device 210 may calculate the service latency time of the packet. For example, client device 210 may determine the service latency time by subtracting a value represented by the third time stamp from a value represented by the fourth time stamp. In this way, client device 210 may determine the service latency associated with a service, and may evaluate the service based on the service latency. Client device 210 may determine if the service latency associated with the service compares favorably to the service latencies associated with other services.

Additionally, or alternatively, client device 210 may calculate a round trip time without service latency of the packet. For example, client device 210 may calculate the round trip time without service latency by subtracting the service latency time from the total round trip time. In this way, client device 210 may determine a latency time associated with monitoring device 220.

Additionally, or alternatively, client device 210 may calculate a round trip time without latency caused by monitoring device 220. For example, client device 210 may calculate the round trip time without latency caused by monitoring device 220 by subtracting, from the total round trip time, a difference between a value represented by the fifth time stamp and a value represented by the second time stamp. In this way, client device 210 may determine a latency associated with the time before monitoring device 220 receives the packet from client device 210, and after monitoring device 220 transmits the packet to client device 210.

Additionally, or alternatively, client device 210 may calculate a total latency caused by monitoring device 220 and the service (e.g., a total latency time). For example, client device 210 may calculate the total latency caused by monitoring device 220 and the service by subtracting the value represented by the second time stamp from the value represented by the fifth time stamp. In this way, client device 210 may determine a total latency associated with monitoring device 220, as well as with service device 230.

Using the calculated values, client device 210 may determine the service latency associated with one or more services. Client device 210 may compare the service latencies associated with the one or more services to perform acceptance testing and comparative analysis of the one or more services, in some implementations. Client device 210 may also better plan network usage, by accounting for the service latency associated with the one or more services when planning network usage.

The above calculation implementations are not exhaustive of possible implementations, and client device 210 may perform other calculations using time stamps 1, 2, 3, 4, 5, and/or 6.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
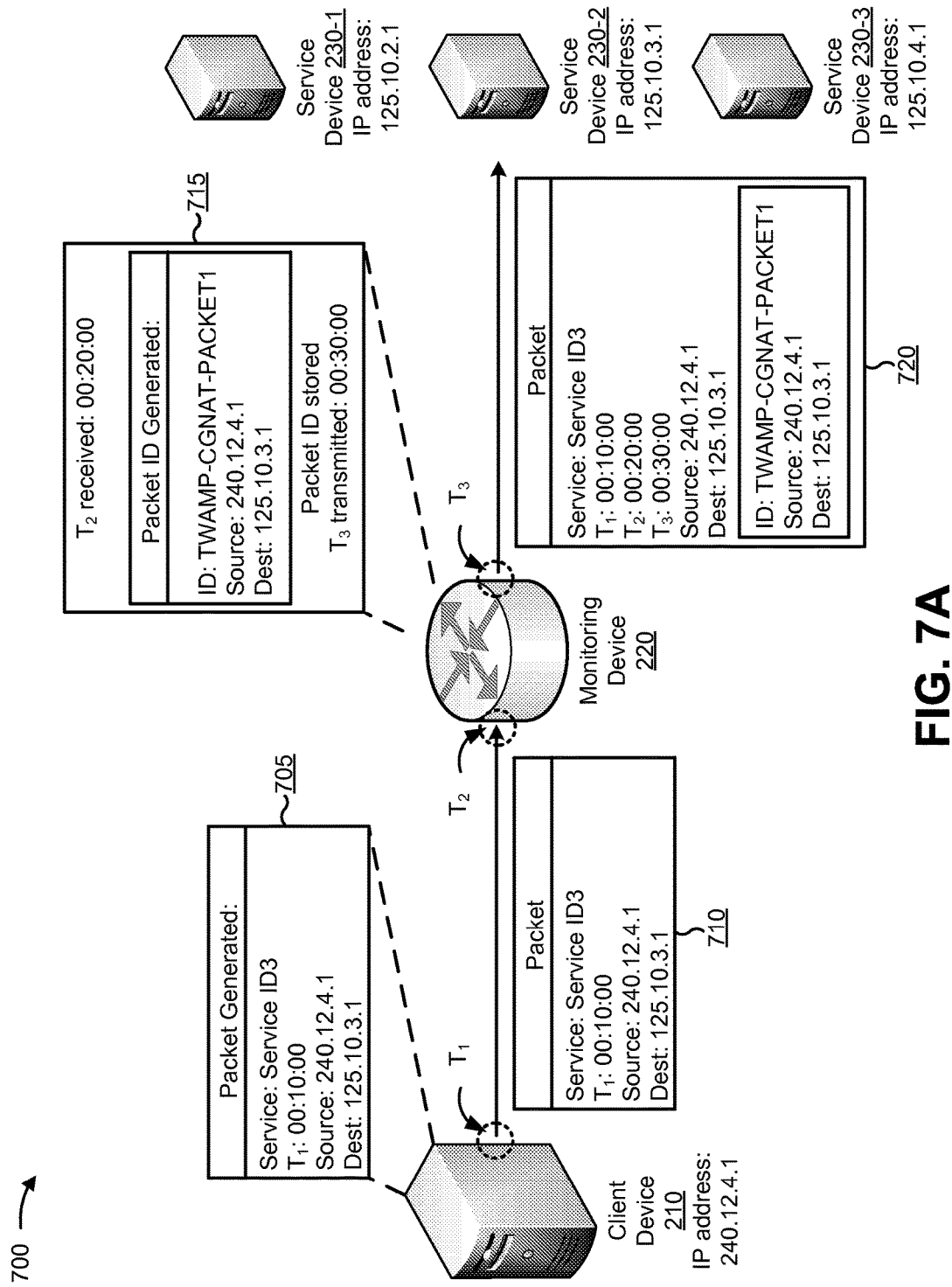
FIGS. 7A-7C are diagrams of an example implementation relating to the example process shown in FIG. 6.
Figure 7B:
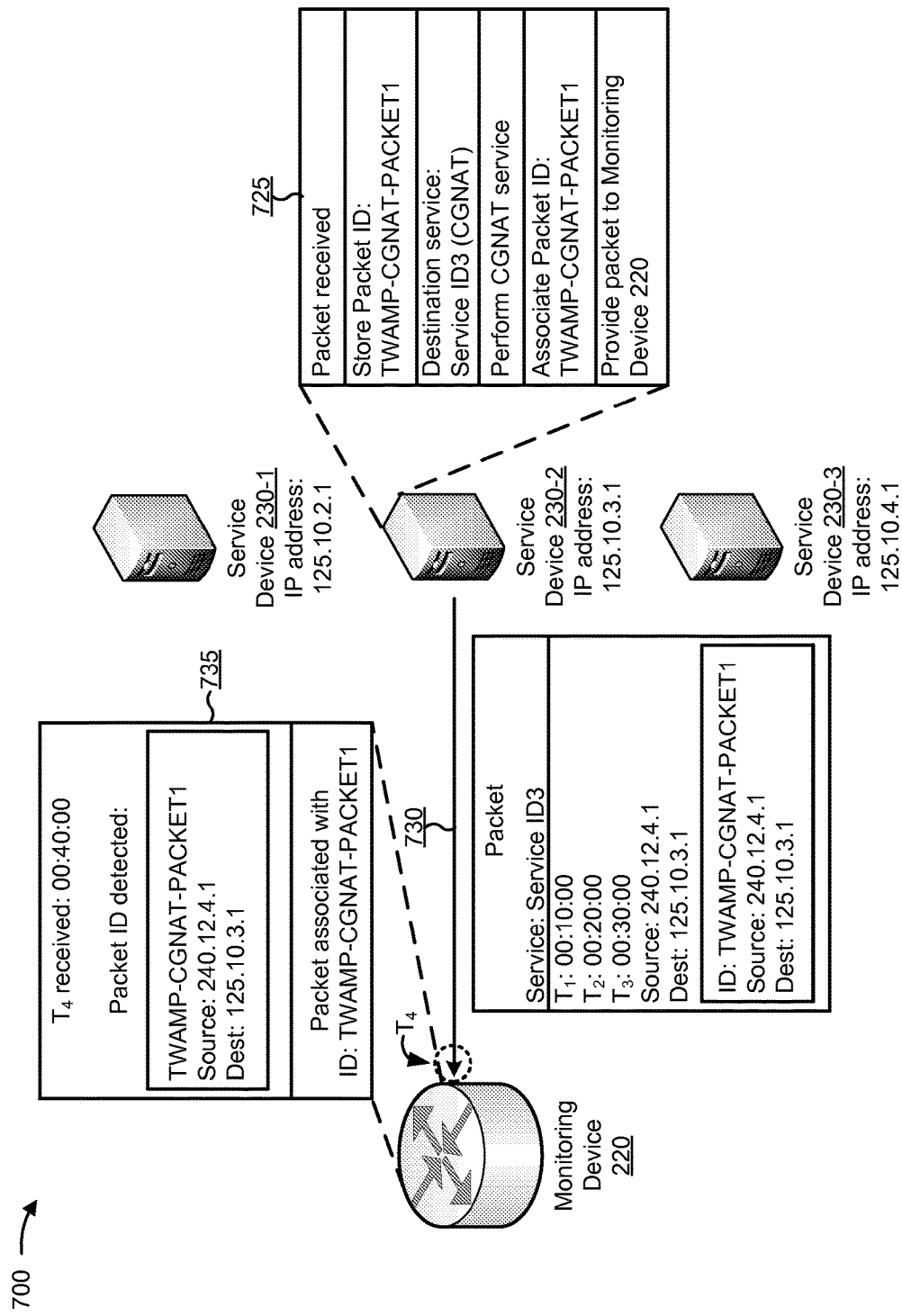
Figure 7C:
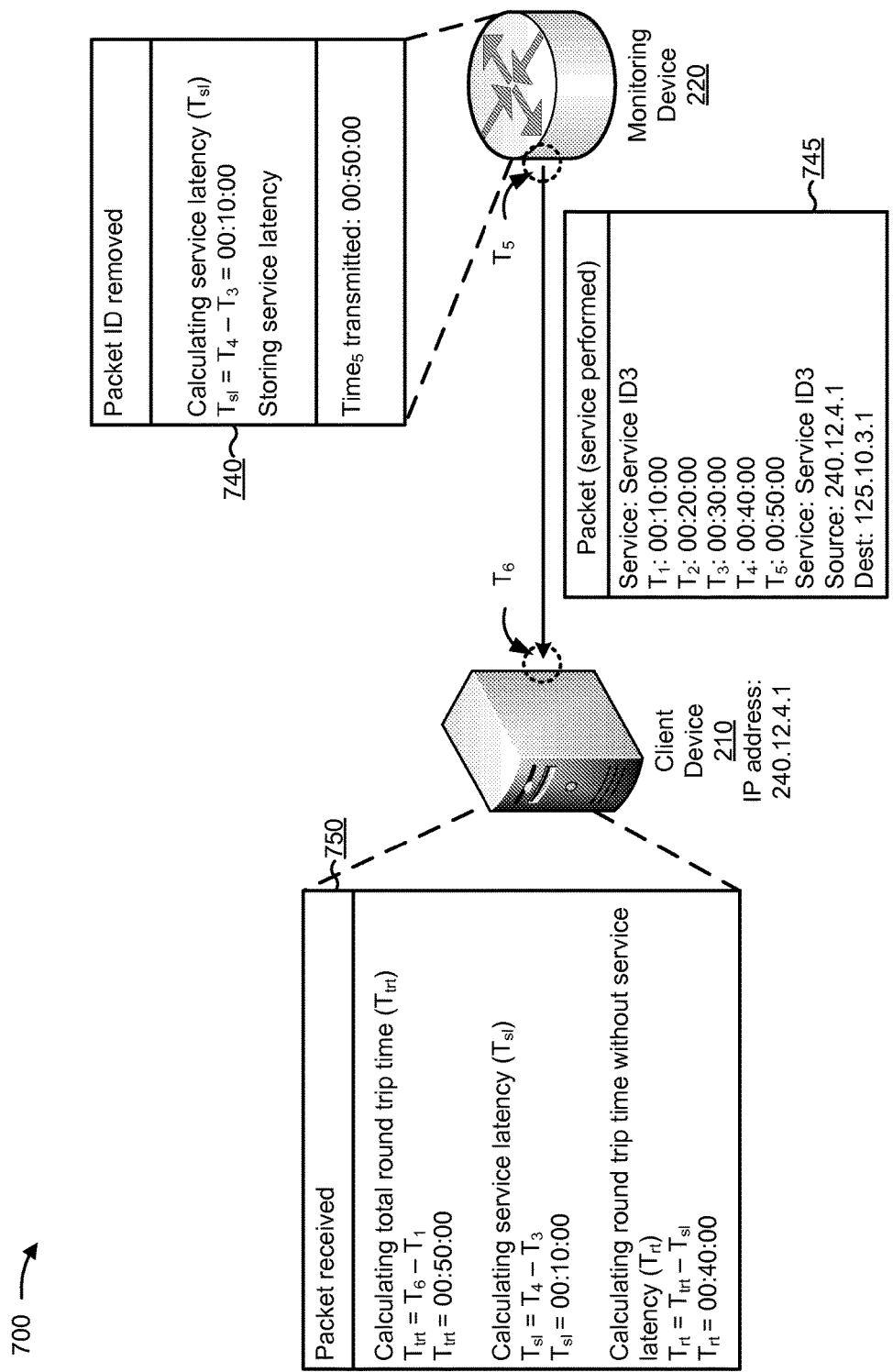

FIGS. 7A-7C are diagrams of an example implementation 700 relating to example process 600 shown in FIG. 6. FIGS. 7A-7C show an example of monitoring latency of a service. For the purpose of FIGS. 7A-7C, assume that the operations shown in FIGS. 5A-5C have been performed. Assume further that the communication session between client device 210 and monitoring device 220 is active. Assume that client device 210 has requested latency monitoring of a CGNAT service, identified by a service identifier Service ID3. Assume further that the service latency monitoring session between client device 210 and monitoring device 220 is active.

As shown in FIG. 7A, and by reference number 705, client device 210 may generate a packet. The packet may include a service identifier (here, Service ID3), identifying a service for service device 230 to perform on the packet. Assume that the service identified by Service ID3 is associated with service device 230-2. As shown, the packet may also include a source identifier, identifying a source of the packet (here, client device 210, identified by an IP address of 240.12.4.1). As further shown, the packet may include a destination identifier, identifying a destination of the packet (here, service device 230-2, identified by an IP address of 125.10.3.1). As shown, the packet may be associated with a first time stamp (here, $T_1$, which represents a time of 00:10:00) associated with a time at which client device 210 transmits the packet to monitoring device 220.

As shown by reference number 710, client device 210 may transmit the packet, including the source identifier, the destination identifier, the service identifier, and the first time stamp. Assume that the packet is transmitted via port 123.

As shown by reference number 715, monitoring device 220 may receive the packet. As further shown, monitoring device 220 may generate a second time stamp (here, $T_2$), which represents a first receipt time of the packet (here, 00:20:00) at which monitoring device 220 received the packet from client device 210. Monitoring device 220 may generate a packet identifier (here, TWAMP-CGNAT-PACKET1). The packet identifier may include the source identifier and the destination identifier. As shown, monitoring device 220 may store the packet identifier. As further shown, monitoring device 220 may generate a third time stamp (here, $T_3$), associated with a time of providing the packet to service device 230-2 (here, 00:30:00). Assume that monitoring device 220 associates the packet identifier and the second and third time stamps with the packet. Assume further that monitoring device 220 determines the service to be provided, based on the service identifier, and selects a service device 230 to which to transmit the packet, based on the service to be provided (here, service device 230-2). As shown by reference number 720, monitoring device 220 may transmit the packet to service device 230-2.

As shown in FIG. 7B, and by reference number 725, service device 230-2 may receive the packet from monitoring device 220. Assume that service device 230-2 determines the packet identifier. As shown, service device 230-2 may remove the packet identifier, and may store the packet identifier. As shown, service device 230-2 may perform the CGNAT service. As further shown, service device 230-2 may associate the packet identifier with the packet (e.g., by appending the packet identifier to the packet, by encapsulating the packet with the packet identifier, by storing the packet identifier in a header of the packet, or the like). As shown by reference number 730, service device 230-2 may provide the packet to monitoring device 220.

In some implementations, client device 210 may identify more than one service. For example, assume that, in block 705, client device 210 instead identifies two services, identified by Service ID2 and Service ID3. As shown by block 520 in FIG. 5B, Service ID2 is associated with a DPI service. Assume that the DPI service is performed by service device 230-1, and that service device 230-1 is associated with an IP address of 125.10.2.1. In this circumstance, the packet shown by block 710 of FIG. 7A may identify Service ID2 and Service ID3, and may identify a destination identifier of 125.10.2.1 and 125.10.3.1, associated with service device 230-1 and service device 230-2, respectively.

The packet identifier generated by monitoring device 220, shown by block 715 of FIG. 7A, may identify the DPI service and the CGNAT service (e.g., the packet identifier may include TWAMP-DPI-CGNAT-PACKET1, or the like). Monitoring device 220 may route the packet to service device 230-1 for performance of the DPI service. After performing the DPI service, service device 230-1 may transmit the packet to service device 230-2 for performance of the CGNAT service. After performing the CGNAT service, service device 230-2 may transmit the packet to monitoring device 220, as shown by reference number 730 of FIG. 7B. In some implementations, monitoring device 220 may generate one or more copies of the packet, and may transmit the one or more copies of the packet to one or more service card devices 230 for performance of one or more services. In this way, monitoring device 220 may determine one or more service latencies, associated with the one or more services.

As shown by reference number 735, monitoring device 220 may receive the packet. Monitoring device 220 may generate a fourth time stamp (here, $T_4$), to represent a second receipt time, when monitoring device 220 received the packet from service device 230 (here, 00:40:00). As shown, monitoring device 230 may detect the packet identifier. As further shown, monitoring device 230 may identify the packet based on the packet identifier. Assume that monitoring device 230 associates the fourth time stamp and the packet.

As shown in FIG. 7C, and by reference number 740, monitoring device 220 may remove the packet identifier from the packet. As further shown, monitoring device 220 may calculate a service latency (here, $T_{sl}$) by subtracting a value indicated by the third time stamp from a value indicated by the fourth time stamp. As shown, monitoring device 220 may store information that identifies the service latency. As further shown, monitoring device 220 may generate a fifth time stamp (here, $T_5$), to represent a second transmission time, when monitoring device 220 transmits the packet to client device 210 (here, 00:50:00). As shown by reference number 745, monitoring device 220 may transmit the packet, including the time stamps 1, 2, 3, 4, and 5, the service identifier, the source identifier, and the destination identifier, to client device 210.

As shown by reference number 750, client device 210 may receive the packet. As shown, client device 210 may generate a sixth time stamp (here, $T_6$), to represent a time when client device 210 receives the packet from monitoring device 220 (here, 00:60:00). As shown, client device 210 may calculate a total round trip time (here, $T_{trt}$) by subtracting a value represented by the first time stamp from a value represented by the sixth time stamp. Here, the total round trip time is 00:50:00. As further shown, client device 210 may calculate a service latency time (here, $T_{sl}$) by subtracting a value represented by the third time stamp from a value represented by the fourth time stamp. Here, the service latency time is 00:10:00. As shown, client device 210 may calculate a round trip time without service latency (here, $T_{rt}$) by subtracting the service latency time from the total round trip time. Here, the round trip time without service latency is 00:40:00. In this way, client device 210 may determine the total round trip latency and the service latency associated with the CGNAT service. Client device 210 may further determine the round trip time without service latency associated with monitoring device 220. Using this information, client device 210 may evaluate the CGNAT service in order to distribute network resources more efficiently.

As indicated above, FIGS. 7A-7C are provided merely as an example. Other examples are possible and may differ from what was described with regard to FIGS. 7A-7C.

In this way, a client device may determine the round-trip latency associated with network traffic, via a secure communication session. The client device may also distinguish the latency associated with performing a service on the network traffic, from the latency associated with the one or more network devices. The client may use latency information to evaluate the service performed on the network traffic. The network operator may use latency information to design the network in a more efficient and latency-sensitive manner.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, at a first receipt time, and from a client device, a packet and a first time stamp associated with the packet,
    the first time stamp being associated with a transmission time of the packet;
  associating, by the device, the packet with a second time stamp,
    the second time stamp being associated with the first receipt time;
  transmitting, by the device and to a service device, the packet and at least one of:
    the first time stamp,
    the second time stamp, or
    a third time stamp associated with transmitting the packet to the service device;
  receiving, by the device, at a second receipt time, and based on a service being performed on the packet, the packet and at least one of:
    the first time stamp, the second time stamp, or
the third time stamp;
associating, by the device, the packet with a fourth time stamp associated with the second receipt time;
calculating, by the device, a service latency based on the third time stamp and the fourth time stamp; and
transmitting, by the device and to the client device, the packet, information identifying the service latency, and at least one of:
the first time stamp,
the second time stamp,
the third time stamp, or
the fourth time stamp.

2. The method of claim 1, where the packet includes information regarding an error associated with the first time stamp.

3. The method of claim 1, where the packet includes information identifying at least one of:
a source,
a destination, or
a manner in which the packet is to be processed.

4. The method of claim 1, where a mirror packet is generated to monitor the service latency.

5. The method of claim 1, further comprising:
generating a packet identifier based on receiving, at the first receipt time, the packet; and
associating the packet identifier with the third time stamp.

6. The method of claim 1, further comprising:
causing the service device to perform the service based on transmitting the packet to the service device.

7. The method of claim 1, where the service includes at least one of:
an IPSEC service,
a network flow monitoring service,
a DPI service,
a CGNAT service,
a subscriber-aware service,
a security service,
a traffic load balancing service,
a content delivery service,
a real time streaming service, or
a firewall service.

8. A device, comprising:
one or more processors to:
receive, at a first receipt time, and from a client device, a packet and a first time stamp associated with the packet,
the first time stamp being associated with a transmission time of the packet;
associate the packet with a second time stamp,
the second time stamp being associated with the first receipt time;
transmit, to a service device, the packet and at least one of:
the first time stamp,
the second time stamp, or
a third time stamp associated with transmitting the packet to the service device;
receive, at a second receipt time, and based on a service being performed on the packet, the packet and at least one of:
the first time stamp,
the second time stamp, or
the third time stamp;
associate the packet with a fourth time stamp associated with the second receipt time;
calculate a service latency based on the third time stamp and the fourth time stamp; and
transmit, to the client device, the packet, information identifying the service latency, and at least one of:
the first time stamp,
the second time stamp,
the third time stamp, or
the fourth time stamp.

9. The device of claim 8, where the one or more processors are further to:
compare, based on receiving the packet at the second receipt time, a packet identifier associated with the packet and at least one of:
a stored packet identifier, or
a stored packet header.

10. The device of claim 8, where the one or more processors, when calculating the service latency, are to:
calculate the service latency by subtracting a value indicated by the third time stamp from a value indicated by the fourth time stamp.

11. The device of claim 8, where the one or more processors are further to:
associate the packet with a fifth time stamp associated with a transmission time of the packet to the client device; and
transmit, to the client device, the information identifying the service latency and at least one of:
the first time stamp,
the second time stamp,
the third time stamp,
the fourth time stamp, or
the fifth time stamp.

12. The device of claim 8, where the one or more processors are further to:
associate the packet with a fifth time stamp associated with a third receipt time,
the third receipt time being associated with a time that the client device receives the packet from the device; and
calculate a total round trip time based on the first time stamp and the fifth time stamp.

13. The device of claim 12, where the one or more processors, when calculating the total round trip time, are to:
calculate the total round trip time by subtracting a value represented by the first time stamp from a value represented by the fifth time stamp.

14. The device of claim 8, where the one or more processors are further to:
compare the service latency with one or more service latencies associated with one or more other services.

15. A non-transitory computer-readable medium storing instructions, the instructions comprising:
one or more instructions that, when executed by one or more processors, cause the one or more processors to:
receive, at a first receipt time, and from a client device, a packet and a first time stamp associated with the packet,
the first time stamp being associated with a transmission time of the packet;
associate the packet with a second time stamp,
the second time stamp being associated with the first receipt time;
transmit, to a service device, the packet and at least one of:
the first time stamp,
the second time stamp, or a third time stamp associated with transmitting the packet to the service device;
receive, at a second receipt time and based on a service being performed on the packet, at least one of:
the packet,
the first time stamp,
the second time stamp, or
the third time stamp;
associate the packet with a fourth time stamp associated with the second receipt time;
calculate a service latency based on the third time stamp and the fourth time stamp; and
transmit, to the client device, at least one of:
the packet,
information identifying the service latency,
the first time stamp,
the second time stamp,
the third time stamp, or
the fourth time stamp.

16. The non-transitory computer-readable medium of claim 15, where the one or more instructions, when executed by the one or more processors, further cause the one or more processors to:
associate the packet with a fifth time stamp associated with a third receipt time,
the third receipt time being associated with a time that the client device receives the packet;
calculate a total round trip time based on the first time stamp and the fifth time stamp; and
calculate a round trip time by subtracting a value associated with the service latency from a value associated with the total round trip time.

17. The non-transitory computer-readable medium of claim 15, where the one or more instructions, when executed by the one or more processors, further cause the one or more processors to:
associate the packet with a fifth time stamp associated with a transmission time of the packet to the client device;
associate the packet with a sixth time stamp associated with a third receipt time,
the third receipt time being associated with a time that the client device receives the packet;
calculate a total round trip time based on the first time stamp and the sixth time stamp; and
calculate a round trip time by subtracting, from a value associated with the total round trip time, a value associated with a difference between the fifth time stamp and the second time stamp.

18. The non-transitory computer-readable medium of claim 15, where the one or more instructions, when executed by the one or more processors, further cause the one or more processors to:
associate the packet with a fifth time stamp associated with a transmission time of the packet to the client device; and
calculate a total latency time by subtracting a value represented by the second time stamp from a value represented by the fifth time stamp.

19. The non-transitory computer-readable medium of claim 15, where the one or more instructions, when executed by the one or more processors, further cause the one or more processors to:
generate a packet identifier based on receiving, at the first receipt time, the packet; and
store the packet identifier.

20. The non-transitory computer-readable medium of claim 19, where the packet identifier is a first packet identifier;
where the one or more instructions, that cause the one or more processors to receive, at the second receipt time, at least one of the packet, the first time stamp, the second time stamp, or the third time stamp, cause the one or more processors to:
receive, at the second receipt time, a second packet identifier and at least one of:
the packet,
the first time stamp,
the second time stamp, or
the third time stamp; and
where the one or more instructions, when executed by the one or more processors, further cause the one or more processors to:
identify the packet based on comparing the second packet identifier and the first packet identifier.

* * * * *